United States Patent [19]

Gath et al.

[11] Patent Number: 4,746,172

[45] Date of Patent: May 24, 1988

[54] SWITCH VALVE ARRANGEMENT

[75] Inventors: Dietmar Gath, Schoeffengrund; Holger von Hayn, Frankfurt am Main, both of Fed. Rep. of Germany

[73] Assignee: Alfred Teves GmbH, Frankfurt am Main, Fed. Rep. of Germany

[21] Appl. No.: 938,586

[22] Filed: Dec. 5, 1986

[30] Foreign Application Priority Data

Dec. 5, 1985 [DE] Fed. Rep. of Germany ....... 3542961

[51] Int. Cl.$^4$ .............................................. B60T 17/18
[52] U.S. Cl. ....................................... 303/92; 303/119
[58] Field of Search ............... 188/181 A; 303/92, 95, 303/97, 103, 110, 111, 114, 117, 119

[56] References Cited

U.S. PATENT DOCUMENTS

| 3,883,189 | 5/1975 | Braun | 303/84 R |
| 4,523,792 | 6/1985 | Belart et al. | 303/92 |
| 4,557,528 | 12/1985 | Leiber | 303/92 |

Primary Examiner—Duane A. Reger

Attorney, Agent, or Firm—James B. Raden; Robert P. Seitter

[57] ABSTRACT

A switch valve arrangement (10) for changing over the inlet of a fluid pressure slave unit (16–19) from the outlet of a first fluid generator (5 or 6) to the outlet of a second fluid pressure generator (1, 13), during switch-on of the second fluid pressure generator for brake systems of automotive vehicles. The arrangement comprises a first valve (V$_1$) which, upon switch-on of the second fluid pressure generator (1, 13) blocks the connection between the first pressure geneator (5) and the fluid pressure slave unit (16–19), and comprises a second valve (V$_2$) releasing the connection between the second fluid pressure generator (1, 13) and the fluid pressure slave unit (16–19). Upon switch-on of the second fluid pressure generator (1, 13), provision is made so that the second valve (V$_2$), with a fluid-reieved first valve (V$_1$) and a fluid pressure-loaded second valve (V$_2$), takes its blocking position, thereby permitting a pressure decrease on the part of the second fluid pressure generator in the event of a conduit break between the first fluid pressure generator and the fluid pressure slave unit to be precluded.

2 Claims, 1 Drawing Sheet

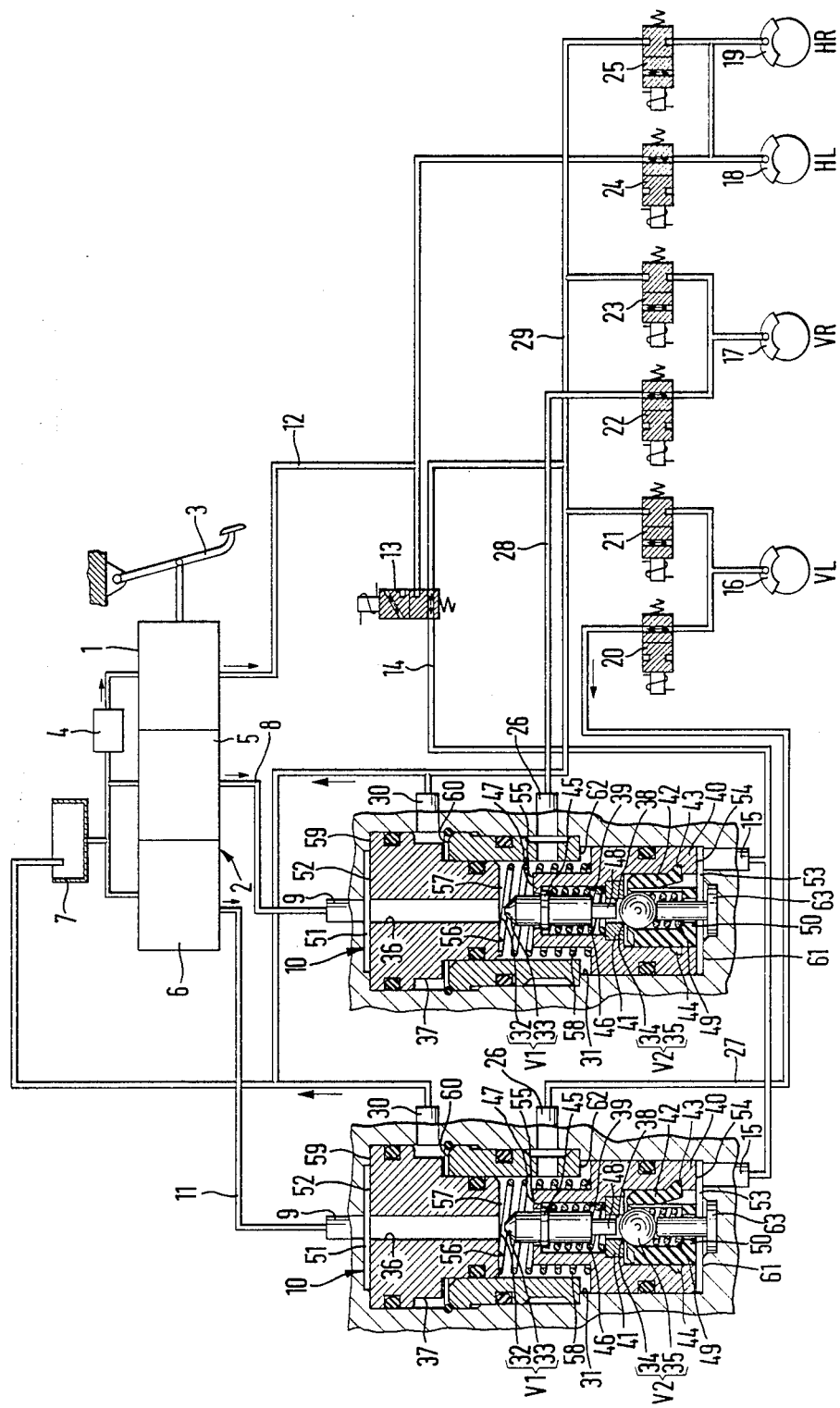

SWITCH VALVE ARRANGEMENT

BACKGROUND OF THE INVENTION

The present invention relates to a switch valve arrangment for changing over the inlet of a fluid pressure slave unit from the outlet of a first fluid pressure generator to the outlet of a second fluid pressure generator during switch-on of the second fluid pressure generator. For brake systems of automotive vehicles, the arrangement comprises a first valve which, during switch-on of the second fluid pressure generator, blocks the connection between the first fluid pressure generator and the fluid pressure slave unit. The arrangement further comprising a second valve releasing the connection between the second fluid pressure generator and the fluid pressure slave unit during switch-on of the second fluid pressure generator.

A switch valve arrangement of this type is described in German Patent Application No. P 35 04 562.0, wherein the first valve is a hydraulically operable 2-way/2-position valve which, in non-actuated condition, takes a passage position and connects the one working chamber forming the first fluid pressure generator of a tandem master brake cylinder of an anti-blocking brake system for automotive vehicles to wheel brakes of the automotive vehicle. In the working position of the 2-way/2-position valve, a check valve is operative within the 2-way/2-position valve such that a fluid pressure flow from the working chamber of the tandem master cylinder to the wheel brakes is precluded. The second valve of the valve arrangement is a check valve separated from the first check valve which, by way of a magnetic valve formed as a switch valve, is connected to the working chamber of a hydraulic brake force booster provided upstream of the tandem master brake cylinder. The magnetic valve is switched over by a slip monitoring electronic system such that the connection between brake force booster and check valve is established as soon as the monitoring electronic system has detected a slip condition in a decelerated vehicle wheel. The outlet of the magnetic valve, moreover, is directly connected to a control inlet of the first valve. Magnetic valve and brake force booster can be regarded as a second fluid pressure generator switching-on of which causes the first valve to be controlled into its blocking position and the second valve to be opened such that the output fluid pressure of the magnetic valve is then applied to the wheel brakes, the brakes will fail.

It is an object of the present invention to provide a switch valve arrangement of the described type which, with the second fluid pressure generator in the switched-on condition and a output circuit break, precludes egress of pressure fluid from the second fluid pressure generator.

SUMMARY OF THE INVENTION

In the practice of the invention, this object is achieved in that the second valve, with the first valve in fluid pressure relieved condition and the second valve in the fluid pressure loaded condition, takes its blocking position.

If the switch valve arrangement is assembled into a dual-circuit brake system for automotive vehicles, in particular, an anti-blocking brake system, as described in German Patent Application No. P 35 04 562.0, egress of brake fluid from the brake force booster operated by controlled pressure is precluded thereby ensuring that pressure of the brake force booster can be continued to be applied to the second brake circuit so that a complete failure of the whole of the brake system is prevented from occurring.

In a switch valve arangement of the afore-described typed, the first and second valves of which respectively comprise a valve seat and a valve closure member cooperating therewith, the configuration can be selected so that the valve seats of both valves are formed in axial bores of stepped pistons disposed in axially displaceable manner in a housing bore, the larger-sized front faces of which respectively confine an inlet chamber for the pressure fluid of the first and second fluid pressure generators, respectively. The front faces are so loaded by a common spring that the valve closure member of the first valve is displaceably disposed in the axial bore of the stepped piston of the second valve and moves into abutment with the valve closure member of the second valve after being mounted onto the valve seat of the first valve. The stroke of the stepped pistons is so confined as to cause the valve closure member of the first valve, with fluid pressures applied to the inlet side, to be seated on the valve seat thereof, removing the valve closure member of the second valve from the valve seat thereof and the valve seat of the first valve, with fluid pressure relieved at the outlet side, to be removed from the valve closure member, and that an outlet chamber is provided between the stepped pistons. If in this respect, the output pressure of the valve arrangement decreases because of a circuit interruption, with the second fluid pressure generator switched on, also the input pressure of the switch valve arrangement on the part of the first fluid pressure generator drops such that the common spring removes the stepped piston of the first valve and, hence, the valve seat thereof, from the closure member of the first valve. The closure member of the second valve therefore is no longer pushed open through the closure member of the first valve. Consequently, the second valve is blocked by the output fluid pressure of the second fluid pressure generator.

BRIEF DESCRIPTION OF THE DRAWING

The invention and its embodiments will now be described in detail with reference to the drawing of a preferred form of an embodiment in which drawing the single FIGURE schematically shows a portion of a hydraulic dual-circuit-type anti-blocking brake system for a four wheel automotive vehicle in which are provided two switch valve arrangements configured as provided by the invention.

DETAILED DESCRIPTION

In the drawing, reference numberal 1 designates a hydraulic force booster which operates a tandem master brake cylinder 2. The force booster 1 is operated by a brake pedal 3, with controlled fluid pressure from a controlled pressure source 4 being applied thereto. If force is applied to the brake pedal 3, the pressure fluid from the controlled pressure fluid source 4 advances into the pressure chamber of the hydraulic force booster 1 so that a pressure proportional to the actuating force develops in the pressur chamber.

The two steps 5 and 6 of the tandem master brake cylinder 2 are energized by a non-pressurized intake reservoir 7, as is the pressure fluid source 4. The working chamber of the first step 5 of the tandem master brake cylinder 2, by way of a conduit 8, is in communiction with the inlet connection 9 of a switch valve arrangement 10. Similarly, the working chamber of the second step 6 of the tandem master brake cylinder 2, by way of a conduit 11, is in communication with an inlet connection 9 of a second switch valve arrangement 10. The working chamber of the force booster 1, by way of a conduit 12, is in communication with an inlet of a magnetic valve 13 in the form of a 3-way/2-position valve which, at the output side, by way of a conduit 14, is in communication with the input connections 15 of th switch valve arrangements 10.

Associated with the wheel brakes 16, 17, 18 and 19, for the front left vehicle wheel (VL), the front right wheel (VR), the rear left wheel (HL) and thee rear right wheel (HR) are respectively two out of six 2-way/2-position valves 20, 21, 22, 23, 24 and 25 electromagnetically controllable by a slip monitoring electronic system (not shown) of which the one 2-way/2-position valve 20, 22 and 24 of each pair of valves associated with one of the wheel brakes 16 to 19, in non-actuated condition, is opened, and of which the other of said valves 21, 23 and 25 is blocked. Moreover, an output connection 26 of the switch valve arrangment 10 connected to step 6, by way of a conduit 27 and by way of the 2-way/2-position valve 20, is connected to the wheel brake 16, whereas the output connection 26 of the switch valve arrangment 10 connected to the second step 5, by way of conduit 28 and by way of the 2-way/2-position valve 22, is connected to the wheel brake 17, and the output conduit 12, via the 2-way/2-position valve 24, is connected to the wheel brakes 18 and 19. The 2-way/2-position valves 21, 23 and 25 connected at the input side to the wheel brakes 16 to 19, at the output side, via conduit 29, are connected to the tank 7 and to tank connections 30 of the switch valve arrangements 10.

Each of the switch valve arrangements 10 is located in a housing bore 31 and contains a first valve $V_1$ comprising a valve seat 32 and a valve closure member 33, and contains a second valve $V_2$ comprising a valve seat 34 and a valve closure member 35. The valve seat 32 is provided in an axial bore 36 of a stepped piston 37 axially displaceable in the housing bore 31 and sealed thereagainst, while the valve seat 34 is provided in an axial bore 38 of a ring 41 inserted into an axial bore 39 of a stepped piston 40. The bore 38 thus forms an extension of the bore 39, with the step formed by the ring 41. The step may also be formed by stepping the bore 39. The stepped piston 40, equally, is disposed in axially displaceable manner, in the housing bore 31 and is sealed thereagainst. Moreover, a sleeve 42 for axially securing the ring 41 is locked in bore 39 by a lug 43 in an annular groove 44.

The closure member 33 comprises a cylindrical bolt including a conical tip and a circumferential shoulder 45 which is forced against a radially inwardly protruding flange 47 at the outlet of the bore 39 by means of a spring 46 surrounding the bolt and supported, on the one hand, on ring 41 and, on the other hand, on shoulder 45. The valve closure member 33, moreover, includes a shaft 48 protruding into the bore 38 downwardly so as to be directly adjacent the valve chamber member 35 of spherical configuration and seated on valve seat 34 thereof.

The valve closure member 35, equally, is loaded by a spring 49 disposed in sleeve 42, which spring is supportd on an inwardly protruding flange 50 of sleeve 42.

The inlet connection 9 terminates in an inlet chamber 51 confined by the larger front face 52 of the stepped piston 37. Similarly, the inlet connection 15 terminates in an inlet chamber 53 confined by the largest-sized front face 54 of the stepped piston 40. The smaller-sized front face 55 of the stepped piston 40 faces the smallst-sized front face 56 of the stepped piston, 37, with both front faces 55 and 56 confining an outlet chamber 57 in communication with the outlet connection 26, and being loaded by a common compression spring 58.

The stroke of the stepped piston 37, is on the one hand, confined by a step 59 of the housing bore 31 on the part of the larger-sized front face 52 of the stepped piston 37 and, on the other hand, by a step 60 of the housing bore 31, respectively placed into abutment with the larger-sized step of the stepped piston 37.

The stroke of the stepped piston 40, equally, is confined, on the one hand, by a step 61 (or the bottom) of the housing bore 31 on the part of the larger-sized front surface 54 and, on the other hand, by a step 62 of the housing bore 31 placed into abutment with the larger-sized step of the stepped piston 40, on the other hand, by way of a stop bolt or spacer 63 protruding into the locking sleeve 42 down to the closure member 35 and, on the other hand, directly. The stroke delimitations are selected as to cause the valve $V_1$, if the stepped piston 40 abuts step 62, to close only if the stepped piston 37 is in abutment with step 60. The front face 52 of the stepped piston 37 is larger in size than the front surface 54 of the stepped piston 40.

In the event of a normal braking operation, in which the slip monitoring electronic system detects no slip on any of the wheels, such that it does not rspond, all magnetically operable way-valves 13 and 20–25 individually controlled by the slip monitoring electronic system, will retain their resting position as shown. In that position, pressure fluid from the force booster 1, by way of conduit 12 and via way-valvee 24, is supplied to the rear wheel brakes 18 and 19. The pressure fluid supply, by way of magnetic valve 13, to inlet chambers 53 of switch valve arrangements 10 is discontinued so that the inlet chambers 53 are non-pressurized, whereas pressure fluid is applied to thee inlet chambers 51 from the working chambers of steps 5 and 6 of tandem master cylinder 2. The stepped pistons 37, therefore, migrate from the position as shown, against the force of spring 58, toward steps 60, whereas the stepped pistons 40, through the force of springs 58 and the pressure prevailing in the outlet chambers 57, are forced into the position as shown, in which valve closure mmbers 35 are forced through the stop bolts 63 against the valve seat 34 thereof. In that position, the valve closure members 33 cannot be seated on their valve seat 32 so that the passageways of the switch valve arrangements 10 are released between their inlet connection 9 and their outlet connections 26. Accordingly, pressure fluid from the working chambers of steps 5 and 6 of the tandem master cylinder 2 is respectively supplied to the front wheel brakes 16 and 17, by way of the switch valve arrangements 9 and the associated way-valves 20 and 22.

If the slip monitoring electronic system now detects a slip condition on any one of the front wheels of the automotive vehicle, it changes over the magnetic valve 13 so that controlled pressure from the working chamber of the force booster 1, by way of conduit 12, magnetic valve 13, conduit 14 and inlet connections 15 is supplied to the inlet chambers 53 of the switch valve arrangements 10. The force booster 1 and the magnetic valve 13, therefore, relative to the switch valve arrangements 10, act as a fluid prssure generator for controlled fluid pressure capable of being turned on and off. Because of the application of pressure fluid to the inlet chambers 53 of the switch valve arrangements 10, the stepped pistons 40 and the valve closure members 33 therewith are displaced against the force of the spring 58 toward the stepped piston 37 so that the valve closure members 33 are seated on the valve seats 32 because the stepped piston 37, under the pressure continuing to prevail in the inlet chambers 51, are held in abutment with the steps and shoulders 60, respectively. At the same time, the valve closure members 35, through the valve closure members 33, are removed from their seats 34 so that the passageways between the inlet connections 15 and the outlet connections 26 are now released while the passageways between the inlet connections 9 and the outlet connections 26 are locked. The controlled fluid pressure can, therefore, be supplied, by way of the switch valve arrangements 10 and the lines 27 and 28 and the way-valve 20 and 22, respectively, to the front wheel brake 16 and 17, respectively. Thereafter, the valves 20 to 23, as wheel slip continues, in usual manner, are capable of being alternatively turned on and off to further reduce the brake pressure.

If during a normal braking operation, a conduit brake occurs, for example, between the working chamber of step 5 of the master brake cylinder 2 and the wheel brake 17, specifically between the way-valve 22 and the wheel brake 17, with a conduit break ahead of the way-valves being less critical because, in practice, substantially all valves and the connecting lines an inlet lines thereof, are formed in a common housing block, no pressure can develop in the inlet chamber 51 concerned. The respective stepped piston 37, therefore, retains its position as shown so that even if a slip is detected in the other brake circuit still intact, the controlled pressure supplied by way of line 14, is not decreased by way of the second valve $V_2$, because the valve closure member 33 of the first valve $V_1$ lying in the defective first brake circuit, does not sit on its valve seat 32. Hence member 33, is unable to push open the valve closure member 35.

Accordingly, an anti-slip control can be continued to be performed in the intact brake circuit.

What is claimed is:

1. A switch valve arrangement for a dual-circuit hydraulic brake system with slip control for use with automotive vehicles having vehicle wheels with wheel brakes, said arangement comprising, in combination:
   a pedal operated brake booster;
   a tandem master brake cylinder operatively coupled to said brake booster, said master brake cylinder having first and second working chambers;
   first and second switch valves each having a first inlet chamber respectively connected to one of said working chambers and each of said switch valves having an outlet chamber respectively connected to a selected one of said vehicle wheel brakes by way of a normally open brake control valve, and each of said switch valves having a second inlet chamber connected to said brake booster by way of a normally closed main control valve;
   wherein when said main control valve is closed pressure is supplied from the first inlet chambers of said switch valves to the respective selected ones of said wheel brakes; and,
   wherein when said main control valve is switched to its open position in response to a slip control signal the resulting pressure at the second inlet chambers of said switch valve closes the pressure communication between said first inlet chambers of said switch valves and the outlet chambers of said switch valves, and opens the pressure communication between said second inlet chambers and said outlet chambers of said switch valves.

2. The arrangement according to claim 1, wherein each of said switch valves includes a first valve seat and a first valve member respectively connected between said first inlet chambers and said outlet chambers of said switch valves and a second valve seat and a second valve member respectively connected between said second inlet chambers and said outlet chambers of said switch valves.

* * * * *